United States Patent
Maltsev et al.

(10) Patent No.: US 6,173,893 B1
(45) Date of Patent: Jan. 16, 2001

(54) FAST FINDING ALGORITHM FOR TWO-DIMENSIONAL SYMBOLOGIES

(75) Inventors: Pavel Maltsev, Edmonds; Richard Penn, Issaquah, both of WA (US)

(73) Assignee: Intermec Corporation, Everett, WA (US)

(*) Notice: Under 35 U.S.C. 154(b), the term of this patent shall be extended for 0 days.

(21) Appl. No.: 08/842,719

(22) Filed: Apr. 16, 1997

(51) Int. Cl.[7] .................................................. G06K 07/10

(52) U.S. Cl. .................. 235/462.09; 235/462.08; 235/462.41

(58) Field of Search ................... 235/462.08, 462.09, 235/462.11, 462.41, 456

(56) References Cited

U.S. PATENT DOCUMENTS

| | | | |
|---|---|---|---|
| 5,124,537 | * | 6/1992 | Chandler et al. ............... 235/462.11 |
| 5,276,315 | * | 1/1994 | Surka ............................... 235/462.09 |
| 5,698,833 | * | 12/1997 | Skinger ........................... 235/462.41 |

* cited by examiner

*Primary Examiner*—Mark Tremblay
(74) *Attorney, Agent, or Firm*—Joan H. Pauly (57) ABSTRACT

A plurality of scan lines is used to detect characteristic features of a checkerboard structure or similar pattern structure of symbology within a field of view. The scan lines cross leading edges of the symbology which provides signals to a plurality of processors. The processors detect instances wherein sequential leading edges exhibit angular shifts corresponding to a pattern of the symbology. A further processor is used to detect when a coincidence of these angular shifts occur, thereby providing an indication of the location of the symbology within the field of view.

19 Claims, 4 Drawing Sheets

FAST FINDING ALGORITHM FOR TWO-DIMENSIONAL SYMBOLOGIES

FIELD OF THE INVENTION

This invention relates to data scanners and to video imaging techniques used with data scanners. More particularly, the invention relates to a finding process, wherein a scanner is used to locate a symbology within a field of view of the scanner.

BACKGROUND OF THE INVENTION

An "over-the-belt" barcode scanner system is a system in which a camera or other imaging device is positioned over or adjacent a pathway, such as a conveyer belt, to scan items which pass through a field of vision of the imaging device. Such a system is primarily designed to read any bar code in a wide field of view. The width of the searching area for over-the-belt scanner systems is typically from 30 cm up to 150 cm.

If the imager is positioned over the belt, the width of the belt defines the number of sensing elements necessary to achieve the desired resolution. For example, if the scanner system needs to read a bar code symbology with a 0.125 mm. (0.005 in) "x" dimension in a 75 cm wide field of view, then the minimum resolution has to be at least one pixel per element or, in this case, one pixel per 0.125 mm. The total number of required sensing elements in this case will be 750/0.125=6000 pixels. As we can see from this example, the width of the searching area in many practical applications is extremely large. The situation is significantly aggravated for two dimensional bar code symbologies such as Data Matrix.

Prior to reading a symbology, it is necessary to locate the symbology. In some cases, the symbology is not aligned with a specific scanner location, so that it is necessary to locate the symbology within a large field of view. The process of locating the symbology for subsequent reading of the symbology is called "finding." Early finding techniques included attempting to scan symbologies until a predetermined beginning or ending sequence of leading edges was detected, followed by further sequences which match a predetermined pattern. This technique is particularly well adapted to data scans of bar codes in similar one-dimensional symbologies. In the case of two-dimensional symbologies, such a scan is inadequate.

Various techniques have been used to find two-dimensional symbologies. These techniques include scanning for characteristics that are added to the symbology to identify a position of the symbology. Typical characteristics of this type include starting bars, center targets and finder patterns. For example, to identify the location of Data Matrix symbology, an L-shaped finder pattern is used to locate the symbology in the field of view of a video imager. Any straight line within the field of view is a candidate for the "L" searching algorithm. This means that in order to find the symbology, we must trace every straight line in an attempt to find another straight line which is perpendicular to the first line. A goal of the present invention is to provide a method of filtering the image in real time in order to eliminate all features which are distinguishable from the symbology.

It would be advantageous if one could efficiently and quickly perform the "finding" operation. Since the code itself need not be read, it would be advantageous if finding were accomplished in a different and simpler manner from the process of reading the code.

SUMMARY OF THE INVENTION

The present invention intends to exploit the general nature of the symbology itself, rather than attempt to make use of a separate locator pattern. This has the advantage of identifying the location of a symbology by looking for features which are characteristic of the symbology itself.

In its basic form, the method of the invention comprises scanning a field of view to find a pattern of high incidence of image changes characteristic of the scan passing a symbology as distinguished from image changes characteristic of background imagery. This is preferably accomplished by identifying the symbology without attempting to fully interpret the symbology itself.

The field of view is a region scanned by a video imager such as a video camera, a laser scanner or other video imaging device in order to generate a bit map of an image. In the case of a video camera, the field of view is usually determined by lens optics and an internal image receiver such as a charge coupled device, but it is also possible to move the imager to complete the field of view. As used in this description, "field of view," means the entire expanse of space visible to an observer (scanner) at a given instant. In the case of a video camera, this means the entire expanse of space visible to the camera at a given instant without moving the camera. If the position of an imager is above a belt, the field of view is horizontal. If it is alongside the belt, the field of view is vertical. Similar spatial considerations apply in either case.

The method of the invention exploits the features of the pattern structure of two-dimensional symbologies by attempting to obtain, but not read, a pattern which is characteristic of a two-dimensional symbology. Two-dimensional symbologies typically have regularly-shaped data patterns, such as the checkerboard structure characteristic of the Data Matrix symbology, or the hexagonal shapes characteristic of the Maxi Code symbology.

In the operation of the invention, it is not necessary that the finding algorithm scan an entire field in order to locate a starting code or target feature of the symbology. Instead, an image is scanned in order to locate characteristics of the symbology without attempting to read the symbology during the finding process. Preferably, the scanning is accomplished by scanning an image in a field of view in multiple scan lines which are in close proximity to each other. The scanned lines are reduced to reference coordinates of points where a brightness of the image changes in value, for example, from white to black. The changes in value are referred to as edge points. The coordinates of the edge points are stored and compared with the coordinates of edge points on adjacent scan lines.

When an edge point is found, the coordinates above and below the edge point are analyzed to determine an edge crossing angle. The scanning of a portion of a symbology results in characteristic angles between sequential edge points. A "hit" is obtained when a change in the angles of sequential edge points meets a predetermined criterion which matches that of a symbology. The symbology is considered to be at the location where a high incidence of hits occurs.

In accordance with the preferred embodiment of the invention, a plurality of processors are used in order to scan across scan lines which are separated by a small distance. The outputs of the processors are compared, so that when there is a redundancy of hits, the detection of a symbology is confirmed. By the use of multiple processors, it is possible to perform scans of the entire field of view and to process the scans without a requirement that real time processing occur between sequential scans. The outputs of multiple scanning processors are provided to a decoding processor, and the decoding processor correlates the data from the scanning processors to determine the location of the symbology.

In accordance with a further aspect of the invention, a scanner for finding a symbology includes an imager, a bit map memory and at least one finding processor. The finding processor is capable of scanning the bit map in order to find a pattern of image changes corresponding to a scan pattern passing the symbology, as distinguished from image changes corresponding to background imagery. This is done without reading the data in the symbology. If the pattern of image changes meets a predetermined criterion, this provides an indication of a location of a symbology.

In accordance with a further aspect of the invention, an apparatus includes an imager which provides image data to a bit map. A group of scan lines, in close proximity to each other, is established from the bit map. A group of processors each reads lines within the group. Each of the processors use closely-adjacent pixels to determine angles of leading edges along the lines. Each processor provides an output indicating when a sequence of said edges meets a predetermined criterion. A further processor receives the leading edge indications. The further processor then provides an indication of a location on the bit map wherein a degree of coincidence of the predetermined criterion occurs between successive lines. This provides an indication of a location of a symbology.

BRIEF DESCRIPTION OF THE DRAWINGS

Like reference numerals are used to indicate like parts throughout the various figures of the drawing, wherein.

DETAILED DESCRIPTION OF THE PREFERRED EMBODIMENTS

Figure 1:
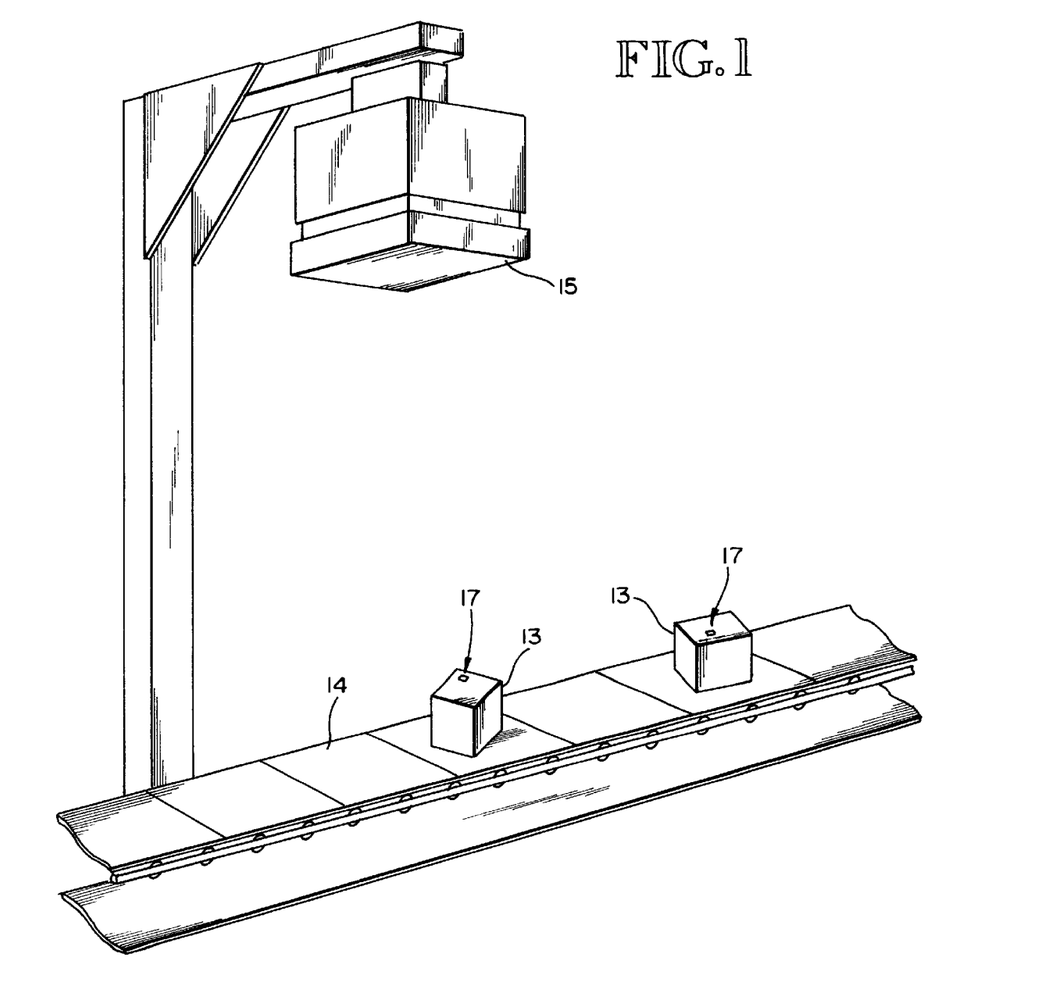
FIG. 1 shows a typical configuration for an over-the-belt scanner.

FIG. 1 shows a typical configuration for an over-the-belt scanner, in which items, such as packages 13 travel along a conveyor belt 14. An imager 15 is positioned above the conveyor belt 14, so that the items 13 pass under a field of view of the imager 15. The purpose of the imager 15 is to read symbology information from the items 13.

Figure 2:
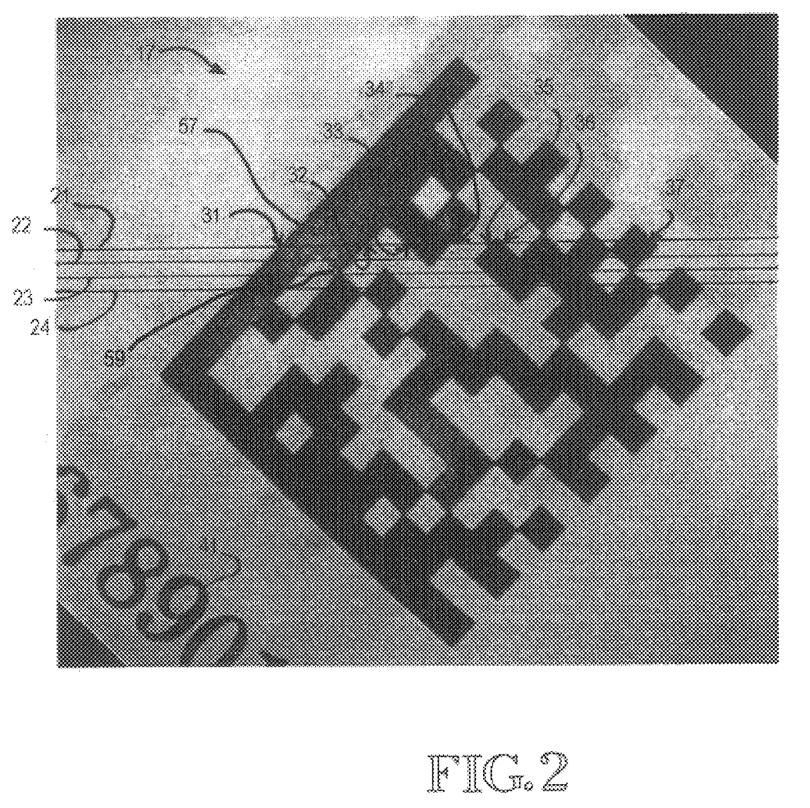
FIG. 2 is a photographic replication of a video image of a symbology, with a set of scanned lines traversing the symbology.

FIG. 2 shows a partial segment of a video image containing a Data Matrix symbology 17. The Data Matrix symbology consists of a plurality of segments defined by 900 borders to create a semi-filled checkerboard pattern. The Data Matrix specification is described in Robert C. Palmer, The Bar Code Book, Third Edition, Helmers Pub., 1995, in Appendix J. Other two-dimensional symbologies are also described in this reference. In order to read the symbology, it is necessary to first locate the symbology within a video field in what is known as a "finding" operation. This is followed by aligning an image of the symbology and analyzing the symbology. Alignment of the symbology is achieved by various means, but this first requires that the finding operation be performed in order to locate the symbology 17 within the field of view of an optic imager 15 (FIG. 1). This invention relates to the finding operation.

Figure 5:
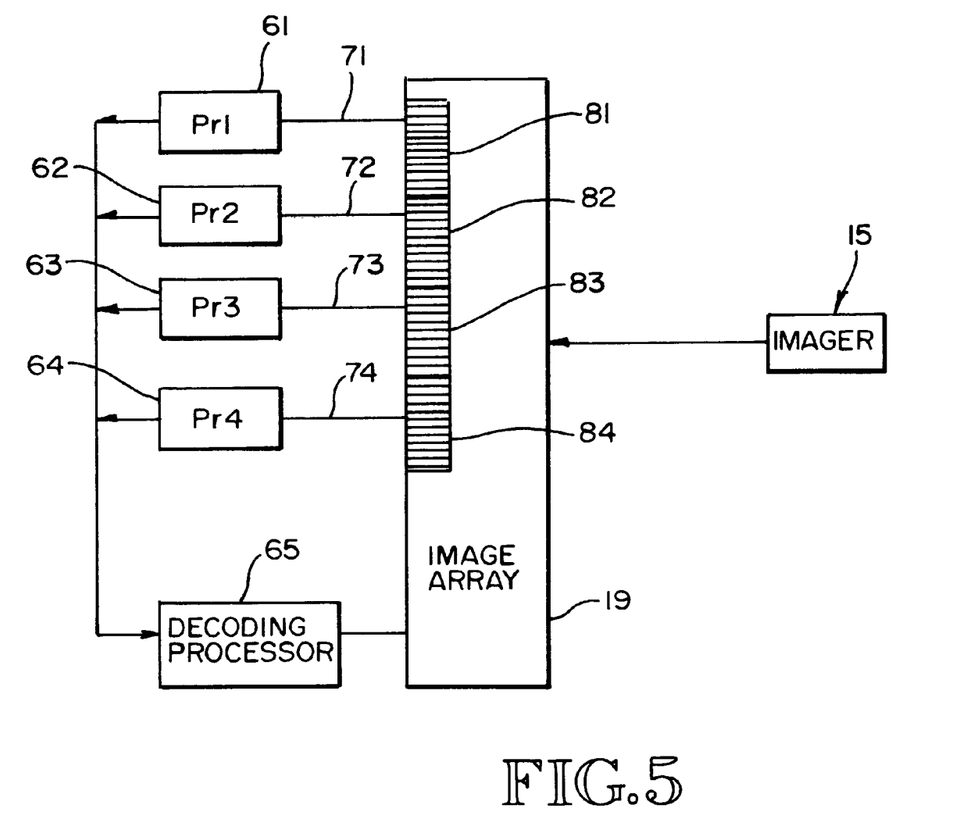
FIG. 5 is a schematic block diagram showing the implementation of the invention.

The imager 15 can be any convenient form of imaging device. In the preferred embodiment, a charge coupled device (CCD) may be used. An example of a CCD imager is the Intermec J7280 video image scanner, sold by Intermec Corporation of Everett, Washington, the assignee of the present invention. It is also possible to use other types of imagers, such as laser scanners. The imager 15 provides signals to a bit map memory or register which functions as an image array 19 (FIG. 5). The image array 19 is able to store raw scanned data from the imager 15.

A plurality of lines are shown in FIG. 2. The lines 21–24 are a plurality of pixels apart, preferably, two pixels apart, in order that data input from one line 21 does not interfere with data input from a second line 22 at any given time. In addition, it is desired to provide a redundancy of lines without the lines 21–24 generating excessively overlapping images. By the lines 21–24 being relatively close, there is a high probability of an occurrence wherein each line 21–24 traverses an anticipated symbology 17.

The lines 21–24 can be described as horizontal in the field of view, where the horizontal reference plane is considered to be absolute coordinates. The symbology 17 may be skewed so that features of the symbology 17 are in a different coordinate system. These features are in alignment with one another if a relative coordinate plane is taken. The relative coordinate plane is referenced to a preferred alignment of the symbology 17.

Following line 21 from left to right, the line 21 traverses a first edge crossing at a pixel 31, and remains within a dark area until it traverses an edge crossing at pixel 32 of a light area. The line 21 then crosses an edge crossing at pixel 33 at the beginning of a dark area, followed by an edge crossing at pixel 34 of a light area. This is followed by edge crossings at pixels 35 and 36 near the tip end of a dark area, and so forth, until the line 21 crosses the last pertinent edge crossing 37 at the border of the symbology 17. Leading edges at pixels 31 and 32 are parallel, or have a 0° angular shift with respect to each other. A leading edge at 33 is at a 90° angle to the leading edge at 32, and a leading edge at 34 is at 90° to the leading edge at 33. A leading edge at 35 is parallel to the leading edge at 34, but a leading edge at 36 is at 900. Further classification of the leading edges defines whether the edge is characterized by change from light to dark or dark to light.

"Hits" are defined by a sequence of leading edges which fall within a criterion, which, in this case, are angular shifts in multiples of 900. It can be seen that in lines 21–24, a density of hits occurs within a small area. The area of a high density of hits is that of the symbology 17. Multiples of an angle (such as 90°) are intended to include 0°. In the case of common two-dimensional symbologies, 360° will also be a multiple.

It is possible that the image is distorted so that the 90° relationship is shifted by a few degrees, but the relationship falls clearly within a class of crossing an image of a symbology having the 90° edges. In experiments, it was determined that it is possible to allow a 20° distortion, which accommodates various errors. In each of these cases, there is a fixed angular relationship between the sequential leading edges. This can be distinguished from the effect of a line crossing the numerical depiction 41 which appears at the bottom of the image. In the case of the numerical depiction 41, there is a less consistent angular relationship between sequential leading edges.

In the finding operation, as line 21 crosses the sequential leading edges, there is a high percentage of leading edge crossings within a short sequence, all of which are within a limited set of angular relationships with one another. The single scan line crossing the edges is inadequate to read the symbology 17 shown in FIG. 1, even if the angular relationships can be understood. In the case of the finding operation, it is merely necessary to provide a multiplicity of scan lines in order to obtain the angular configurations of the leading edges. In the case of reading the symbology 17, further processing of the video image is required. To complete the finding operation in real time, reading the symbology 17 during the initial finding operation is neither necessary nor desired.

Figure 3:
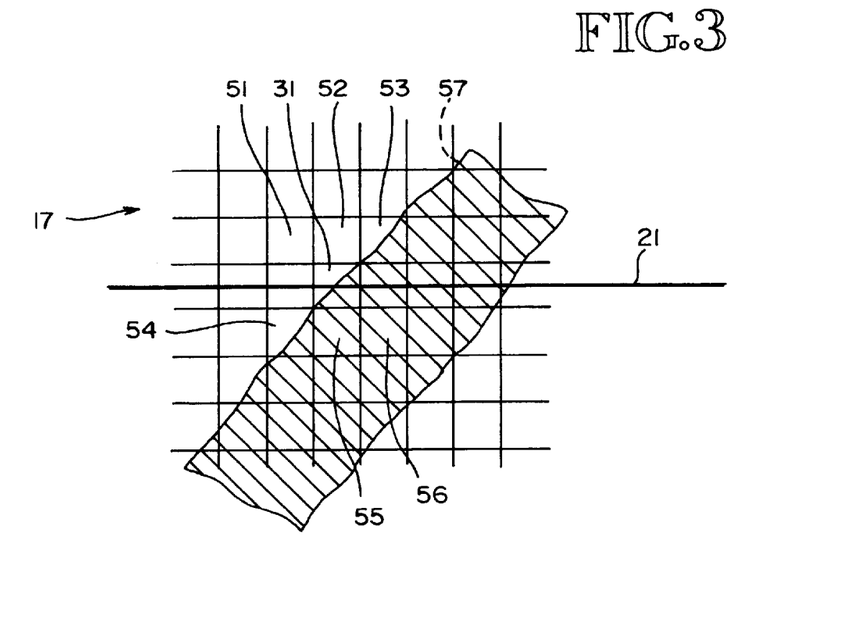
FIG. 3 shows a pattern of pixels used to provide indications of angular characteristics of leading edges.

The detection of the leading edges is accomplished by locating edge crossings along one of the lines, such as line 21. Where a leading edge occurs, such as at each of locations 31–37, the image array 19 is examined. Referring to FIG. 3, pixels 51–56 are located above and below line 21 and above and below an edge crossing point at pixel 31. Pixels 51–53 are one pixel above line 21 and pixels 54–56 are one pixel below line 21. Pixel 51 is at coordinates which are one pixel behind and one pixel above pixel 31, and so forth. As can be seen, pixels 53 and 54, as well as 31, lie across a leading edge 57 of the symbology 17. Therefore, the leading edge 57 is defined in the image array as crossing pixels 53, 31 and 54, and at an angle corresponding to that crossing.

Therefore, in order to determine the angular relationships between the leading edges, the scan represented by line 21 is compared with pixels 51–53 above line 21 and with pixels 54–56 below line 21. The pixels are preferably one scan line apart, although it is also possible to pick pixels which are more than one scan line apart. In any event, the use of the surrounding pixels 51–56 provides an indication of a leading edge 57. The desired information relating to the angular positions of the leading edges at pixels 31–37 is obtained in a similar manner. Each line 21–24 will have a high incidence of "hits" where predetermined angular positions of the leading edges are detected. This high incidence of "hits" occurs at a location of a symbology 17. In some circumstances, a high incidence of hits will also occur as a result of various types of background "noise" and artifacts. Thus, it is possible that there will be substantial ambiguities which might occur from reading a single line in some environments. It turns out that, if the scanning a field of view is accomplished with multiple scan lines in close proximity, the results of scanning a symbology will show a consistency. If such scanning is accomplished substantially simultaneously, the consistency will translate to a substantial coincidence of "hits" over time. For this reason, additional lines 22, 23, 24 are used, along with adjacent scan lines in the manner described in connection with the scan line 21. Thus, while four lines 21–24 are described, each of the lines 21–24 are compared to adjacent scans, implying that data from four lines 21–24 actually requires the use of data from twelve scan lines, unless some of the scan lines are used for multiple comparisons.

By collecting the leading edge position and angular information from multiple lines 21–24, it is possible to obtain data concerning the coincidence of detected leading edges. In the example described in connection with the scan at line 21, leading edge 31 would provide corresponding indications for all four lines 21–24. A leading edge at pixel 32 would provide corresponding information from scans at lines 21 and 22, but would produce either different or no corresponding data from scans at lines 23 and 24. A leading edge at pixel 33 would be detected in scans 21 and 22, with no data generated from scans 23 and 24. A leading edge at pixel 35 would have a corresponding indication from a scan at line 22, but indications from lines 23 and 24 would be different, and a leading edge at pixel 37 would exhibit a coincidence at lines 23 and 24 but not line 22. As can be seen, such coincidences are characteristic of lines 21–24 crossing a Data Matrix symbology 17. Such coincidences are less likely to occur when the lines 21–24 cross other visual effects. It can also be seen that the amount of data required to obtain the occurrences of such angular crossings is substantially less than the amount of data which would be required to decode the symbology. Thus, with a limited amount of data gathering and data processing, it is possible to locate or "find" the symbology 17.

Figure 4:
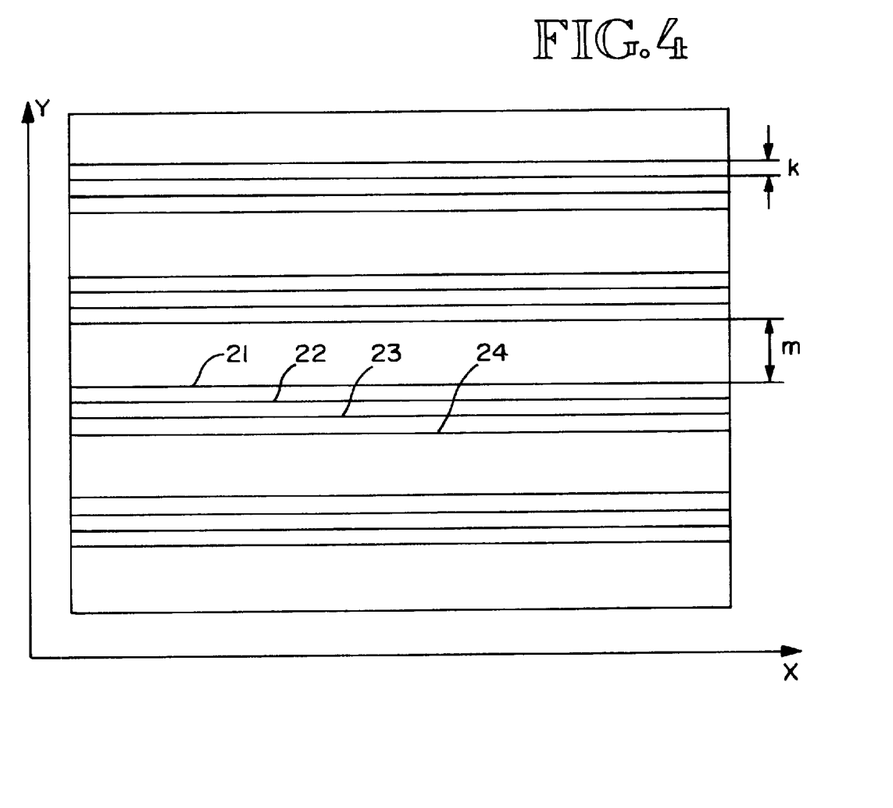
FIG. 4 shows a pattern of scanning.

The above description assumes that the lines 21–24 cross the symbology 17. In order to assure that this occurs within a field of view which is larger than the symbology 17, multiple sets of scans are effected, as shown in FIG. 4. Each line 21–24 is separated by a predetermined number of pixels k, with a separation between groups of scans of m. The selection of the distance between individual ones of lines within a set is determined by an anticipated size of the symbology 17, so that a high probability is established of all four lines within at least one set, such as lines 21–24, crossing the symbology 17. The space between the sets of lines is determined by the anticipated smallest size of the symbology 17. By using the anticipated smallest size, at least one of the sets should cross the symbology regardless of the position of the symbology within a predetermined range.

Referring again to FIG. 2, the searching strategy begins with the horizontal scanning of the image by groups of four parallel lines, such as 21–24. The scanning corresponds to the parallel lines $L_i[j]$, i=1, . . . ,4; j=0, . . . ,N separated by k pixels between lines and m pixels between the groups of lines. N is the horizontal size of the image and $L_i[j]$ is a gray scale value of the j-th pixel of line i.

On every scanning line $L_i[j]$, i=1, . . . ,4; j=0, . . . ,N, absolute coordinates of points where the brightness of the image changes in value from "white" to "black" or vice versa are identified. These are the edge points. The coordinates of edge points will be kept in an array $P[v]_i$, i=1, . . . , 4; v=0, . . . ,$v_i$. To find the location of edge points, a precalculated threshold value T is selected and is closely connected with the dynamic range of the image. If $L_i[j]>T$, it is assumed that j-th pixel of the i-th line is "white", and "black" if $L_i[j]<T$. While grey scale value is discussed for $L_i[j]$, it is possible to substitute other values as well.

Edge classification is achieved by looking at the angular characteristics of the edge points $P[v]_i$, i=1, . . . ,4, v=0, . . . , $V_i$. For every edge point we calculate an angle $A_{vi}$=arctan(dy/dx), where:

$$dx=G[x_{vi}-1, y_{vi}]-G[x_{vi}+1, y_{vi}]$$

$$dy=G[x_{vi}, y_{vi}-1]-G[x_{vi}, y_{vi}+1],$$

$(x_{vi}, y_{vi})$ are X-Y coordinates of the edge point $P[v]_i$, i=1, . . . ,4, v=0, . . . ,$V_i$, G[x,y] is a gray scale value of the pixel in the coordinate (x,y).

This angle will be perpendicular to the tangent of the edge line in the point $(x_{vi}, y_{vi})$.

All edge points $P[v]_i$, i=1, . . . ,4, v=0, . . . ,$V_i$, can be divided into two classes in accordance with their angular value $A_{vi}$, i=1, . . . ,4, v=0, . . . ,$V_i$. The angular difference between two classes is approximately 90°. We will allow a tolerance between angular values in the same class of value D, which, in practical applications, can be held to ±20°.

The finding algorithm consists of first classifying the edges. Referring to FIG. 2, the edge points at location 31 on lines 21–24 are considered to be of the same class, which may be designated Class A. The edge points at location 32 on lines 21 and 22 are also of the same class, in that they are at the same angle, but are in a different class in that they are leading edges from dark to light. The leading edges at location 33 for lines 21 and 22 are of a different class (Class B) in that they are at a 90° angle from those at pixels 31 and 32, but represent a change from light to dark as is the case of pixel 31. We can tell nothing about point 59, on line 23, because it is unclear from the scan what the angular value will be. The classification results of edge points can be represented as follows: P[ ]$_2$=AABAB . . . , P[ ]$_2$=AABABAI . . . , P[ ]$_3$=AAIIABB . . . , P[ ]$_4$=AAABABB . . . , where I is indeterminate result.

Let $a_1, a_2, \ldots a_n$ be a finite sequence of points from some compact set $S \subset Z \times Z$, where Z is a set of all positive integers, and let $\mu(s, g)$ be some measure, where $s, g \in S$. Sequential distances between points $a_1, a_2, \ldots, a_n$ are defined as distances $d_1=\mu(a_1, a_2), \mu(a_2, a_3), \ldots, \mu(a_{(n-1)}, a_n)$. As can be seen from FIG. 2, the points from the same class in any location are sequentially close to each other. If the points belong to the same edge, then sequential distances between the points do not exceed:

$$e=\sqrt{(k*k+k*k)}=k*1.41, \text{ where } \mu_{(s,g)}=\sqrt{(s*s+g*g)}$$

The next step of the finding algorithm consists of the calculation of edge angles at every location relative to a coordinate system x-y. The edge angles are calculated using the following formulas:

If, at the rth location, there are four points $(x_1,y_1), (x_2,y_2), (x_3,y_3), (x_4,y_4)$ in the class, then the edge angles are calculated as:

$$E_r=(\arctan((y_3-y_1)/(x_3-x_1))+\arctan((y_4-y_2)/(x_4-x_2))*0.5.$$

If, at the rth location, there are three points $(x_1,y_1), (x_2,y_2), (x_3,y_3)$ in the class, then the edge angles are calculated as:

$$E_r=\arctan((y_3-y_1)/(x_3-x_1))+\arctan((y_2-y_1)/(x_2-x_1))+\arctan((y_3-y_2)/(x_3-x_2))*0.33.$$

In the case of two points, the edge angles are equal to:

$$E_r=\arctan((y_2-y_1)/(x_2-x_1)).$$

The final step of the algorithm consists of the analysis of the angle characteristics of the edges in the processing group of lines. If, beginning from the point $(x_b, y)$, $x_b<N$ to the point $(x_e, y)$, $x_e<N$, at every location edge angles are equal to some value W or approximately W+90 degrees, then we assume that this group of lines are crossing a checkerboard structure. The points $(x_b-K, y)$ and $(x_e+K, y)$ where K is some fixed value, for example, 100, are limit points of the possible location of the Data Matrix symbology.

The sequential processing of several groups of lines finally identify all potential areas of Data Matrix symbology locations. If we know the symbology location areas, we can now apply an algorithm designed for the recognition of the Data Matrix "L"-shaped finding pattern in these much reduced areas. It may be possible to use the information obtained during the finding operation to achieve image alignment. In most instances, there are other techniques which will be used to achieve such image alignment.

Referring again to FIG. 2, in order to achieve a real time analysis of the scans along the multiple lines 21–24 of each set, the data from the multiple lines 21–24 must be available for comparison. This can be accomplished in real time, wherein the data from each line 21–24 is compared with pixel lines before and after each line, and then the data from each line 21–24 is compared with data from each other line. Using a single processor requires substantial processing capability, in that the data must be analyzed at nearly the scan rate of an imager 15 used to generate the scan lines. Such a real time processing requirement is avoided by using multiple processors, with each line 21–24 being assigned one processor. This accomplishes two results: (1) the speed of processing need only accommodate the real world movement of the symbology through the field of view; and (2) the processors can be operated synchronously and substantially simultaneously. Thus, as can be seen from FIG. 5, processors 61–64 are used to read data from lines 21–24, respectively. This same set of processors 61–64 is used for the four lines in each set, so that the ability to process the data need only match a speed necessary to effect an analysis of three scans associated with one line times the number of groups within the field of vision. A fifth processor 65 is used to compare the outputs of processors 61–64. In this manner, it is possible to find the symbologies which will be decoded before it becomes necessary to find the next symbology.

The imager 15 is positioned so that items which may include symbologies 17 pass the imager's field of view. In order to scan the symbology 17, the imager 15 provides an image of the field of view into the image array 19. The image array 19 is used to provide the scans for lines 21–24 to the processors 61–64, which analyze the data to determine a potential area of the symbology 17 within the field of view. A processor (processor 65 in the preferred embodiment) is then used to read the symbology 17.

As indicated, to achieve high speed finding capabilities, four processors 61–64 are used, with each processor determining leading edge characteristics relating to one of the four lines 21–24 in each scan group. Referring back to FIG. 2, each processor 61–64 will begin computing the hits after its respective lines of video data have entered an image array 19. In this particular implementation, the k value is 2; that is, each processor 61–64 will evaluate every other line for edge information.

Once line 21 and a subsequent scan line have entered the buffer, processor 61 can begin the edge classification algorithm. The angular information for a point on an edge utilizes points in the image that surround the current point; hence, the classification process searches the image array 19 in order to obtain all points surrounding the point of interest. Processor 61 will use data from the image array 19 to evaluate the angular information of all edge points found on line 21. This process repeats with processor 62 on line 22, and so on for processors 63 and 64.

After the angular information for a point such as pixel 31 has been determined, classification can begin. Processor 61 can begin this process at the beginning of line 22 and continue until the end of a ninth scan line if it is determined that the group skip is 1 (if no lines are skipped). The minimum length of time any processor has to classify all points on a line is 8 line times. This establishes the timing specification for the combined edge location and classification algorithms and will be limited by the speed of the processor module. The output from the four processor modules 61–64 is a location in the image array 19 where a multiplicity of Class A and Class B objects reside within a specified distance from each other indicating a high probability of containing a checkerboard-like pattern.

The purpose of the above algorithm is to allow real time processing of the symbology as it passes by the scanner on a moving conveyor. The symbology must be found and decoded before the next package arrives to minimize the impact of the scanner latency time on the throughput of the conveyor system.

As can be seen from FIG. 5, the individual processing modules send the location information to the decoding processor 65. The decoding processor 65 now has only to deal with those areas of the image which have a high probability of containing a checkerboard pattern. The image array 19 can take many different forms including a separate memory bank for each of processors 61–64, multi-port memories or a combination of both. The only requirement is that the image points reported by processors 61–64 must be synchronized to the decoding processor 65 as it reads the image array 19. Each of the four processors 61–64 is preferably provided with a separate port 71–74 so that the processors 61–64 may operate simultaneously without memory read conflicts.

In a preferred embodiment, the image array 19 is provided with separate output buffers 81–84. These output buffers may be of any convenient configuration, provided that each of processors 61–64 can effect substantially simultaneous reads of the image array 19.

What has been described is a specific configuration of the invention, described in connection with scanning of a Data Matrix symbology code. It is intended that the invention be applicable for scanning a field of view for any of a variety of codes, provided that a generalized pattern can be deduced from the symbology. Ideally, the symbology should have an established angular relationship in order that consecutive edges within defined classes can be located. By way of example, for Maxi Code, which includes hexagons, consecutive angles which have a relationship of multiples of 60° from one another would be subject to the finding algorithm, despite the fact that the Maxi Code also includes a center target area which does not include the 60° multiple angles. In addition, since different symbologies have different characteristics, it is possible for the decoding processor 65 to use the finding algorithm to identify which of several types of symbologies are within the field of view. In that way, if the hits correspond to a pattern generated by a Maxi Code symbology, the decoding processor 65 would respond accordingly without a need for further distinguishing the type of symbology after the symbology has been found. It is possible to implement the invention with a wide variety of configurations of processors and in a wide variety of scan patterns, provided that a reading of hits is obtained.

The four processors 61–64 may be combined as one unitary processor. In addition, the decoding processor 65 and the four processors 61–64 may be combined, as is understood by those skilled in the art of computer central processing units. For this reason, the reference to the form or function of the four processors and the decoding processor 65 is meant to include a single processor performing the function of one or more processors. In other words, a description of a processor capable reading data in the bit map, such as processor 61, and a description of a processor for performing further functions, such as processor 65, is intended to include a single processor performing both of these functions.

It is possible to use the invention without intending to read the symbology 17 afterwards. As examples, an image of the symbology 17 may be stored, or the items may be sorted according to detected presences of symbologies.

It is also possible to scan in patterns other than a raster pattern. For example, a rosette scan or an oscillating scan can be effected, provided there is a high probability of crossing the symbology 17 during the finding operation.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A method for determining a location of a symbology by scanning an image for a pattern comprising:

a) selecting a plurality of groups of scanned lines $L_i[j]$, $i<1$, $j=0,\ldots,N$ separated by k pixels between lines and m pixels between the groups of lines, where N is the horizontal size of the image and $L_i[j]$ is a value of the j-th pixel of a line i;

b) identifying on each scanned line $L_i[j]$, $j=0,\ldots,N$, absolute coordinates of points where a value of the image changes to establish edge points;

c) storing said coordinates of edge points in an array $P[v]_i$, $v=0,\ldots,V_i$;

d) performing an edge classification by determining selected characteristics of the edge points; and e) using the edge classification to determine the existence of an area of the image characterized by a high incidence of sequential edge classifications of a predetermined type;

wherein $k>0$, and $m>k$; and values of k and m are determined based on an anticipated smallest size of the symbology, to ensure that at least one group crosses a symbology and to establish a high probability that all lines within said at least one group cross the symbology.

2. The method of claim 1, comprising:

a) selecting as a number of lines i in individual ones of said groups, a number that is greater than 1 ($i>1$); and b) using the edge classification to determine the existence of an area by identifying a coincidence of said high incidence of sequential edge classifications of the predetermined type on multiple ones of said lines i.

3. The method of claim 13, comprising:

a) substantially simultaneously operating a plurality of processors, one processor for each scanned line of the group, to perform said edge classification; and b) using a further processor to identify a coincidence of said high incidence of sequential edge classifications of the predetermined type.

4. The method of claim 1, wherein determining said selected characteristics of the edge points includes determining angular characteristics of the edge points $P[v]_i$, i, $v=0,\ldots,V_i$ by calculating an angle $A_{v,i}=\arctan(dy/dx)$, where $$dx=G[x_{v,i}-1, y_{v,i}]-G[x_{v,i}+1, y_{v,i}],$$

$$dy=G[x_{v,i}, y_{v,i}-1]-G[x_{v,i}, y_{v,i}+1],$$

$(x_{v,i}, y_{v,i})$ are X-Y coordinates of the edge points $P[v]_i$, $i=1,\ldots,4$, $v=0,\ldots,V_i$, and $G[x,y]$ is said value of the pixel.

5. A method for determining a location of a symbology by scanning an image for a pattern comprising:

a) selecting a plurality of groups of scanned lines $L_i[j]$, $i\geq 0,\ldots,N$ separated by k pixels between lines and m pixels between the groups of lines, where N is the horizontal size of the image and $L_i[j]$ is a value of the j-th pixel of a line i;

b) identifying on each scanned line $L_i[j]$, j=0, ... N, absolute coordinates of points where a value of the image changes to establish edge points;

c) storing said coordinates of edge points in an array $P[v]_i$, v=0, ..., $V_i$;

d) performing an edge classification by determining selected characteristics of the edge points;

e) using the edge classification to determine the existence of an area of the image characterized by a high incidence of sequential edge classifications of a predetermined type; and f) at every location relative to a coordinate system x-y, calculating edge angles $E_r$ using the following formulas:

1) in the case of four points $(x_1,y_1)$, $(x_2,y_2)$ $(x_3,y_3)$, $(x_4,y_4)$, calculating the edge angle as $E_r=(\arctan((y_3-y_1)/(x_3-x_1))+\arctan((y_4-y_2)/(x_4-x_2))*0.5$;

2) in the case of three points $(x_1,y_1)$, $(x_2,y_2)$, $(x_3,y_3)$, calculating the edge angle as $E_r=\arctan((y_3-y_1)/(x_3-x_1))+\arctan((y_2-y_1)/(x_2-x_1))+\arctan((y_3-y_2)/(x_3-x_2))*0.33$; and 3) in the case of two points, calculating the edge angle as $E_r=\arctan((y_2-y_1)/(x_2-x_1))$.

6. The method of claim 5, comprising:

a) determining whether beginning from a point $(x_b, y)$, $x_b<N$ to a point $(x_e, y)$, $x_e<N$, at every location edge angles are equal to a predetermined value or a multiple thereof, and, if so, considering that the group of scanned lines crosses a structure characteristic of a symbology having edge classifications of the predetermined type; and b) establishing limit points of a possible location of said symbology as $(x_b-K, y)$ and $(x_e+K, y)$ where K is a predetermined value.

7. The method of claim 5, comprising:

a) determining whether beginning from a point $(x_b, y)$, $x_b<N$ to a point $(x_e, y)$, $x_e<N$, at every location edge angles are equal to approximately 90° or a multiple thereof, and, if so, considering that the group of scanned lines crosses a structure characteristic of a symbology having a checkerboard pattern; and b) establishing limit points of a possible location of said symbology as $(x_b-K, y)$ and $(x_e+K, y)$ where K is a predetermined value.

8. The method of claim 5, comprising:

a) determining whether beginning from a point $(x_b, y)$, $x_b<N$ to a point $(x_e, y)$, $x_e<N$, at every location edge angles are equal to approximately 60° or a multiple thereof, and, if so, considering that the group of scanned lines crosses a structure characteristic of a symbology having an hexagonal pattern; and b) establishing limit points of a possible location of said symbology as $(x_b-K, y)$ and $(x_e+K, y)$ where K is a predetermined value.

9. Apparatus for finding a symbology comprising:

a) a bit map;

b) a plurality of processors, one for reading each line within a group of lines from the bit map, the lines in the group being in close proximity to each other;

c) each of said processors using data within the corresponding line to detect edge crossings;

d) each of said processors responding to detected edge crossings by obtaining pixel data in close proximity to said detected edge crossings;

e) each of said processors using said pixel data to determine angles of leading edges at said edge crossings;

f) said processors providing an output indicating when a sequence of said leading edges meets a predetermined criterion; and g) an additional processor receiving indications of said leading edges meeting said criterion from each of said plurality of processors and providing an indication of a location on the bit map wherein a predetermined degree of coincidence of said predetermined criterion occurs between successive lines, thereby providing an indication of a location of a symbology.

10. Symbology scanning apparatus for finding a symbology comprising:

a) an imager and a memory for storing bit map data of a field of view from the imager; and b) a plurality of finding processors capable of reading data in the bit map and scanning the bit map in order to find a pattern of image changes corresponding to said scanning passing the symbology as distinguished from image changes corresponding to background imagery, without reading the data in the symbology, and using said pattern of image changes to determine when the image changes meet a predetermined criterion to provide an indication of a location of a symbology; said plurality of processors including one processor for reading data in each line within a group of lines from the bit map, the lines in the group being in close proximity to each other, and said processors being capable of being operated at least substantially simultaneously.

11. Symbology scanning apparatus as described in claim 10, comprising:

a) said plurality of processors reading said data in the bit map in order to find patterns of a high incidence of image changes corresponding to said scanning passing the symbology, each of said processors reading data in close proximity, on the bit map, to the corresponding line and located between the corresponding line and adjacent lines;

b) said processors providing an output indicating when said pattern of image changes meets a predetermined criterion; and c) a further processor receiving indications of said pattern of image changes meeting said criterion from each of said plurality of processors and providing an indication of a location on the bit map wherein a predetermined degree of coincidence of said predetermined criterion occurs between successive lines, thereby providing an indication of a location of a symbology.

12. Symbology scanning apparatus as described in claim 10, wherein the image changes include a characteristic of an angular relationship of edges, said indication of a location of the symbology including a pattern of high incidence of image changes including an indicia of said angular relationship of edges embodied in a spatial relationship between the edges.

13. Symbology scanning apparatus as defined in claim 10, comprising:

a) each said finding processor providing leading edge detection for scanning a field of view; and b) the finding processor responding to said leading edge detection by evaluation of closely-adjusted areas in the field of view and using said evaluation to provide a signal indicating a pattern of image changes in the scan outputs including a characteristic of an angular relationship of edges.

14. Method for scanning a field of view in order to find a symbology within the field of view comprising:

a) providing a series of closely spaced scans, in which said scans fall within a minimum anticipated image size of the symbology;

b) operating a series of processors, one for each scan in said series of closely adjacent scans, to detect a pattern of edge crossings generated by the closely spaced scans and detect when an angular relationship between successive edge crossings meets a predetermined criterion;

c) repeating said scans at different lines in the field of view and operation of said processors to detect a pattern and an angular relationship; and d) operating an additional processor to receive from said series of processors indications of when angular relationships between successive edge crossings meet said criterion and to determine a location in the field of view where a substantial number of said edge crossings meet said criterion.

15. The method of claim 14 characterized by:

(a) detecting said pattern occurring at a plurality of scans within a group, each of said plurality fitting within a separation parameter less than an anticipated smallest symbology image within the field of view; and (b) detecting a coincidence of said detected edge crossings within said criterion in order to provide an indication of a location of the symbology within the field of view.

16. The method of claim 14, wherein detecting said angular relationship comprises examining points that surround each edge crossing and are between the edge crossing and adjacent scans.

17. The method of claim 1, wherein performing said edge classification includes, for each edge point, determining an angular characteristic of the edge point by examining points that surround the edge point and are located between the edge point and adjacent scanned lines.

18. The method of claim 3, wherein performing said edge classification includes, for each edge point, determining an angular characteristic of the edge point by examining points that surround the edge point and are located between the edge point and adjacent scanned lines.

19. Symbology scanning apparatus for finding a symbology comprising:

a) an imager and a memory for storing bit map data of a field of view from the imager; and b) at least one finding processor connected to said memory and capable of reading data in the bit map and scanning the bit map in order to find a pattern of image changes corresponding to said scanning passing the symbology as distinguished from image changes corresponding to background imagery, and using said pattern of image changes to determine when the image changes meet a predetermined criterion to provide an indication of a location of a symbology; said processor being capable of determining the location of a symbology by:

1) selecting a plurality of groups of scanned lines from the bit map $L_i[j]$, $i \geq 1$, $j=0, \ldots, N$ separated by k pixels between lines and m pixels between the groups of lines, where N is the horizontal size of the image and $L_i[j]$ is a value of the j-th pixel of a line i;

2) identifying on each scanned line $L_i[j]$, $j=0, \ldots, N$, absolute coordinates of points where a value of the image changes to establish edge points;

3) storing said coordinates of edge points in an array $P[v]_i$, $v=0, \ldots V_i$;

4) performing an edge classification by determining selected characteristics of the edge points;

5) using the edge classification to determine the existence of an area of the image characterized by a high incidence of sequential edge classifications of a predetermined type; and 6) at every location relative to a coordinate system x-y, calculating edge angles $E_r$ using the following formulas:

i) in the case of four points $(x_1,y_1)$, $(x_2,y_2)$, $(x_3,y_3)$, $(x_4,y_4)$, calculating the edge angle as $$E_r=(\arctan((y_3-y_1)/(x_3-x_1))+\arctan((y_4-y_2)/(x_4-x_2)))*0.5;$$

ii) in the case of three points $(x_1,y_1)$, $(x_2,y_2)$, $(x_3,y_3)$, calculating the edge angle as $$E_r=\arctan((y_3-y_1)/(x_3-x_3))+\arctan((y_2-y_1)/(x_2-x_1))+\arctan((y_3-y_2)/(x_3-x_2))*0.33; \text{ and}$$

iii) in the case of two points, calculating the edge angle as $$E_r=\arctan((y_2-y_1)/(x_2-x_1)).$$

* * * * *